(12) United States Patent
Lin et al.

(10) Patent No.: US 11,598,489 B2
(45) Date of Patent: Mar. 7, 2023

(54) LIGHT BULB APPARATUS

(71) Applicant: XIAMEN LEEDARSON LIGHTING CO., LTD, Fujian (CN)

(72) Inventors: Xianwu Lin, Fujian (CN); Youqin Lin, Fujian (CN); Renhua Zou, Fujian (CN); Fanglei Zhao, Fujian (CN); Zhixian Wu, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/393,988

(22) Filed: Aug. 4, 2021

(65) Prior Publication Data

US 2022/0042655 A1 Feb. 10, 2022

(30) Foreign Application Priority Data

Aug. 5, 2020 (CN) .......................... 202021610301.3

(51) Int. Cl.
| | |
|---|---|
| *F21K 9/232* | (2016.01) |
| *F21K 9/238* | (2016.01) |
| *F21K 9/235* | (2016.01) |
| *H05B 45/357* | (2020.01) |
| *F21V 23/00* | (2015.01) |
| *F21V 29/50* | (2015.01) |
| *F21V 3/02* | (2006.01) |
| *F21V 23/04* | (2006.01) |
| *H01Q 1/22* | (2006.01) |
| *F21Y 115/10* | (2016.01) |
| *H05B 47/19* | (2020.01) |

(52) U.S. Cl.
CPC .............. *F21K 9/232* (2016.08); *F21K 9/235* (2016.08); *F21K 9/238* (2016.08); *F21V 3/02* (2013.01); *F21V 23/007* (2013.01); *F21V 23/045* (2013.01); *F21V 29/50* (2015.01); *H01Q 1/22* (2013.01); *H05B 45/357* (2020.01); *F21Y 2115/10* (2016.08); *H05B 47/19* (2020.01)

(58) Field of Classification Search
CPC .......... F21K 9/232; F21K 9/235; F21K 9/238; F21V 29/50; F21V 29/502; F21V 29/503; F21V 29/508; H05B 45/357
See application file for complete search history.

(56) References Cited

FOREIGN PATENT DOCUMENTS

| CN | 103912810 A | * | 7/2014 | ............... F21K 9/23 |
|---|---|---|---|---|
| CN | 109519728 A | * | 3/2019 | ............. F21K 9/232 |
| EP | 3627044 A1 | * | 3/2020 | ........... F21V 23/004 |
| WO | WO-2016146339 A1 | * | 9/2016 | ............. F21K 9/238 |

* cited by examiner

*Primary Examiner* — Alan B Cariaso
(74) *Attorney, Agent, or Firm* — Chun-Ming Shih; Lanway IPR Services

(57) ABSTRACT

A light bulb apparatus includes a bulb shell, an antenna, a driver, a light source plate and a bulb cap. The light source plate has a first layer and a second layer. The LED module is disposed on the first layer. The second layer includes a metal portion. The metal portion carries heat generated by the LED module for heat dissipation. The antenna is disposed upon the first layer. A bulb cap is connected to an external power. The driver is electrically connected to the antenna for receiving a wireless signal. The driver converts the external power to a driving current supplied to the LED module.

19 Claims, 8 Drawing Sheets

LIGHT BULB APPARATUS

FIELD

The present invention is related to a light bulb apparatus, and more particularly related to a light bulb apparatus with convenient setting.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Modern light bulbs are required to have more functions in addition to provide illumination. For example, people would like to have more control over light bulbs. Some speakers or function modules may even be installed on light bulb devices.

However, it is important to consider signal quality particularly when light bulb devices are usually installed on a high place like a ceiling. Without a convenient wireless control over the light bulb devices, these extended functions are difficult to be applied.

Therefore, it is important to provide a design to consider manufacturing cost, signal quality and compact design fo a light bulb device. Besides, it is also important to avoid the antenna to affect the final light output.

SUMMARY

In some embodiments, a light bulb apparatus includes a bulb shell, an antenna, a driver, a light source plate and a bulb cap.

The light source plate has a first layer and a second layer.

The LED module is disposed on the first layer.

The second layer includes a metal portion.

The metal portion carries heat generated by the LED module for heat dissipation.

The antenna is disposed upon the first layer.

The bulb cap connected to an external power.

The driver is electrically connected to the antenna for receiving a wireless signal.

The driver converts the external power to a driving current supplied to the LED module.

In some embodiments, the antenna is a ceramic module embedding a metal antenna unit.

In some embodiments, the ceramic module is a plate with a horizontal diameter of a bottom surface larger than a thickness of the ceramic module.

The bottom surface engages the first layer of the light source plate.

In some embodiments, an antenna conductive path is disposed to connect the antenna and the second layer of the light source plate to use the second layer together forming an antenna receiver.

In some embodiments, the metal portion of the second layer has an antenna pattern corresponding to the wireless signal.

In some embodiments, the light source plate has a third layer disposed between the first layer and the second layer.

The third layer has a larger thickness than the first layer and the second layer.

In some embodiments, the light source plate further includes a fourth layer.

The fourth layer is electrically connected to the antenna.

The second layer and the fourth layer correspond to different wireless frequencies.

In some embodiments, the ceramic module has a reflective surface for reflecting a light of the LED module.

In some embodiments, the thickness of the ceramic module is between 1 mm to 5 mm.

In some embodiments, the driver has a driver plate.

The driver plate and the LED module are placed on opposite sides of the light source plate.

A wireless circuit is placed on the light source plate.

The LED module and the wireless circuit are electrically connected to the driver on the driver plate via signal pins of the driver plate.

The signal pins are inserted into sockets on the light source plate.

In some embodiments, the light source plate has a central groove for placing the antenna.

In some embodiments, an electric insulator is placed between the antenna and the light source plate.

In some embodiments, the ceramic module containing multiple antenna units.

The multiple antenna units respectively correspond to different wireless protocols.

In some embodiments, the multiple antenna units are detachably stacked together.

In some embodiments, the light source plate has an antenna groove for placing the antenna.

In some embodiments, an antenna electrode is placed on the antenna groove for electrically connecting the antenna to the driver.

In some embodiments, the driver and the LED module are placed on the same side of the light source plate, and the antenna is placed in a center of the light source plate.

In some embodiments, the bulb cap has an Edison cap for attaching to an Edison socket for connecting to the external power.

In some embodiments, the driver and the LED module are placed at opposite sides of the light source plate.

The driver has an antenna pin inserted through a pin hole of the light source plate to electrically connected to the antenna.

In some embodiments, the driver has a power pin inserted through the pin hole to electrically connect to the LED module.

DETAILED DESCRIPTION

Figure 3:
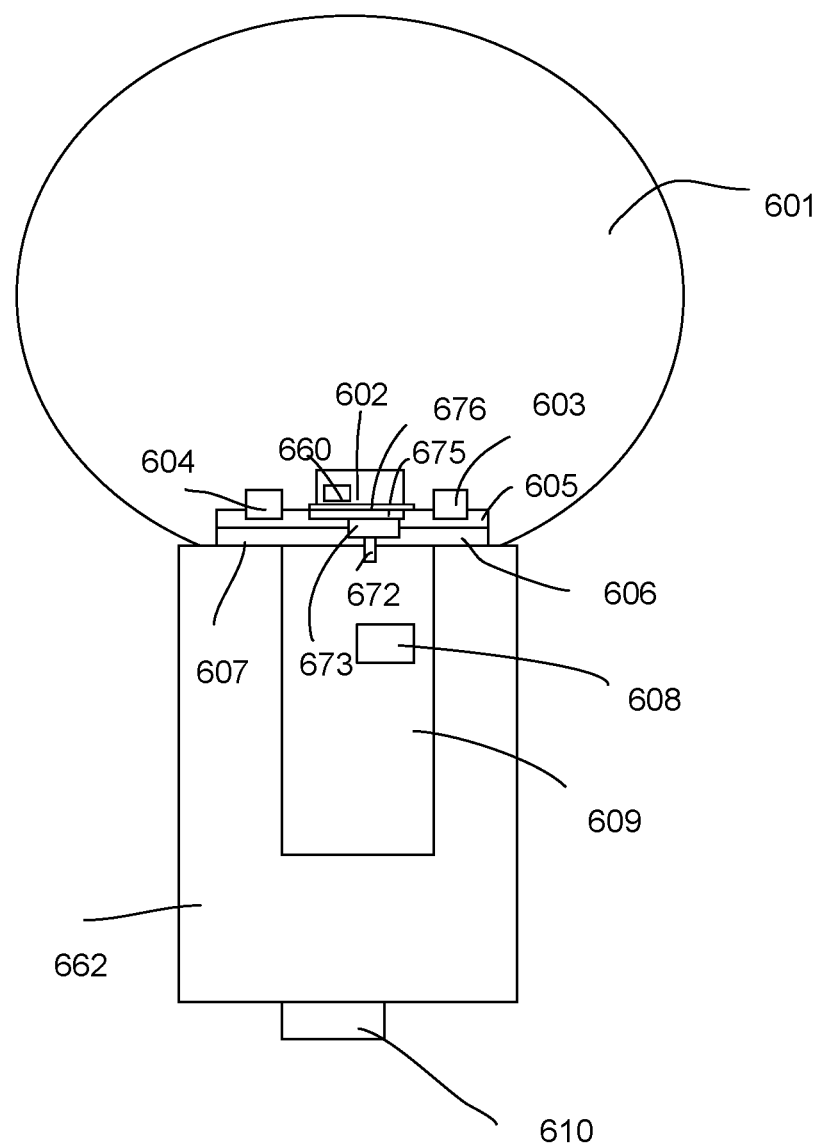
FIG. 3 illustrates another embodiment.

In FIG. 3, a light bulb apparatus includes a bulb shell 601, an antenna 602, a driver 608, a light source plate 607 and a bulb cap 662.

The light source plate 607 has a first layer 605 and a second layer 606.

The LED module 604 is disposed on the first layer 605.

The second layer 606 includes a metal portion.

Figure 5:
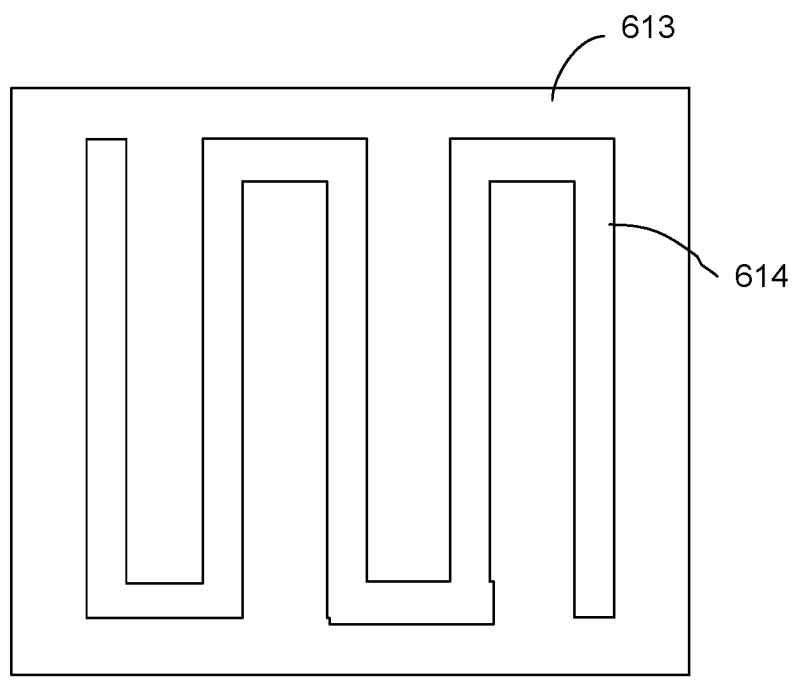
FIG. 5 illustrates an antenna pattern formed on a second layer of a light source plate.

In FIG. 5, a second layer 613 has a metal portion 614 with an antenna pattern corresponding to a wireless protocol, e.g. 2.4 GHz of Wi-Fi.

The metal portion carries heat generated by the LED module for heat dissipation.

In FIG. 3, the antenna 602 is disposed upon the first layer 605.

The bulb cap 601 connected to an external power, e.g. via an Edison cap 610 to a 110V AC power source.

The driver 608 is electrically connected to the antenna 602 for receiving a wireless signal, e.g. a Wi-Fi signal, a Zig-Bee signal, a phone signal.

The driver 608 converts the external power to a driving current supplied to the LED module 604.

In some embodiments, the antenna 602 is a ceramic module embedding a metal antenna unit 660. Specifically, such design provides a ceramic material encapsulates a metal antenna while not interfering the signal quality.

Figure 8:
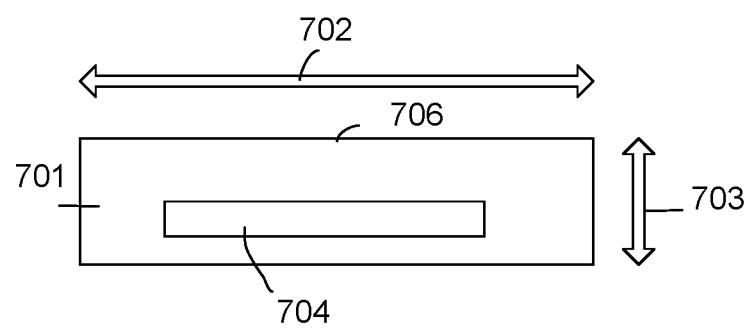
FIG. 8 shows a ceramic module antenna.

In FIG. 8, the ceramic module is a plate 701 with a horizontal diameter 702 of a bottom surface 706 larger than a thickness 703 of the ceramic module.

The bottom surface 706 engages the first layer of the light source plate.

Figure 7:
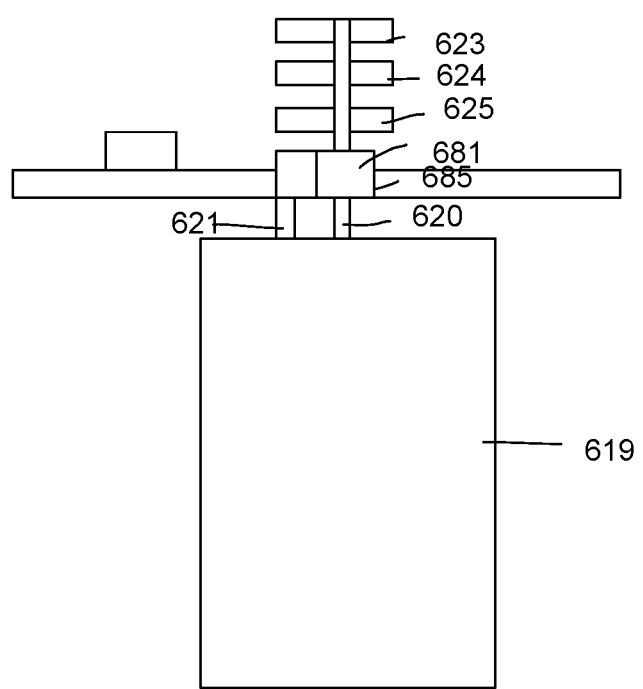
FIG. 7 illustrates another example of major components in another embodiment.

In FIG. 7, an antenna conductive path is disposed to connect the antenna and the second layer of the light source plate to use the second layer together forming an antenna receiver.

In some embodiments, the metal portion of the second layer has an antenna pattern corresponding to the wireless signal.

FIG. 5 shows an example of such design. The second layer 613 has an antenna pattern 614. The antenna pattern 614 works with the antenna to form a complete antenna.

Figure 4:
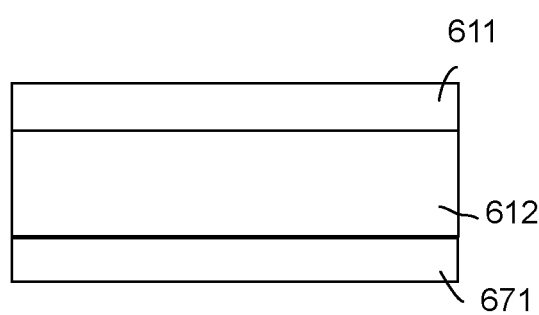
FIG. 4 illustrates a light source plate example.

In FIG. 4, the light source plate has a third layer 612 disposed between the first layer 611 and the second layer 671.

The third layer 612 has a larger thickness than the first layer 611 and the second layer 671. The third layer 612 may be formed with an aluminum plate as a support and a heat dissipation layer.

Figure 6:
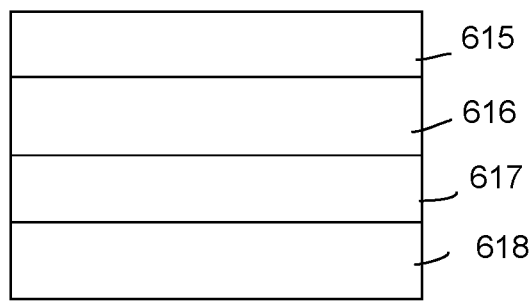
FIG. 6 illustrates multiple layers of the light source plate for different wireless protocols.

In FIG. 6, the light source plate further includes a fourth layer 618, in addition to a first layer 615, a second layer 617 and a third layer 616.

The fourth layer 618 is electrically connected to the antenna.

The second layer 617 and the fourth layer 618 correspond to different wireless frequencies, e.g. one layer corresponding to 2.4 GHz wireless signals and another layer corresponds to 5 GHz wireless signals.

In some embodiments, the ceramic module has a reflective surface for reflecting a light of the LED module. Specifically, a painting or a thin layer is formed on the surface of the antenna to reflect light to desired direction, instead of being absorbed by the antenna.

In some embodiments, the thickness of the ceramic module is between 1 mm to 5 mm.

In FIG. 3, the driver 608 has a driver plate 609.

The driver plate 609 and the LED module 604 are placed on opposite sides of the light source plate 607.

In some embodiments, a wireless circuit 603 is placed on the light source plate.

The LED module 604 and the wireless circuit 603 are electrically connected to the driver on the driver plate via signal pins 672 of the driver plate 609.

The signal pins 672 are inserted into sockets 673 on the light source plate 607.

In some embodiments, the light source plate 607 has a central groove 675 for placing the antenna 602.

In some embodiments, an electric insulator is placed between the antenna and the light source plate. For example, an elastic ring may be used as an electric insulator 676.

In FIG. 7, the ceramic module containing multiple antenna units 623, 624, 625.

The multiple antenna units 623, 624, 625 respectively correspond to different wireless protocols.

In some embodiments, the multiple antenna units 623, 624, 625 are detachably stacked together.

In some embodiments, the light source plate has an antenna groove for placing the antenna.

In some embodiments, an antenna electrode 681 is placed on the antenna groove for electrically connecting the antenna to the driver.

In some embodiments, the driver and the LED module are placed on the same side of the light source plate, and the antenna is placed in a center of the light source plate.

In some embodiments, the bulb cap has an Edison cap for attaching to an Edison socket for connecting to the external power.

In some embodiments, the driver and the LED module are placed at opposite sides of the light source plate.

The driver has an antenna pin 620 inserted through a pin hole 685 of the light source plate to electrically connected to the antenna.

In some embodiments, the driver 619 has a power pin 621 inserted through the pin hole to electrically connect to the LED module.

Figure 1:
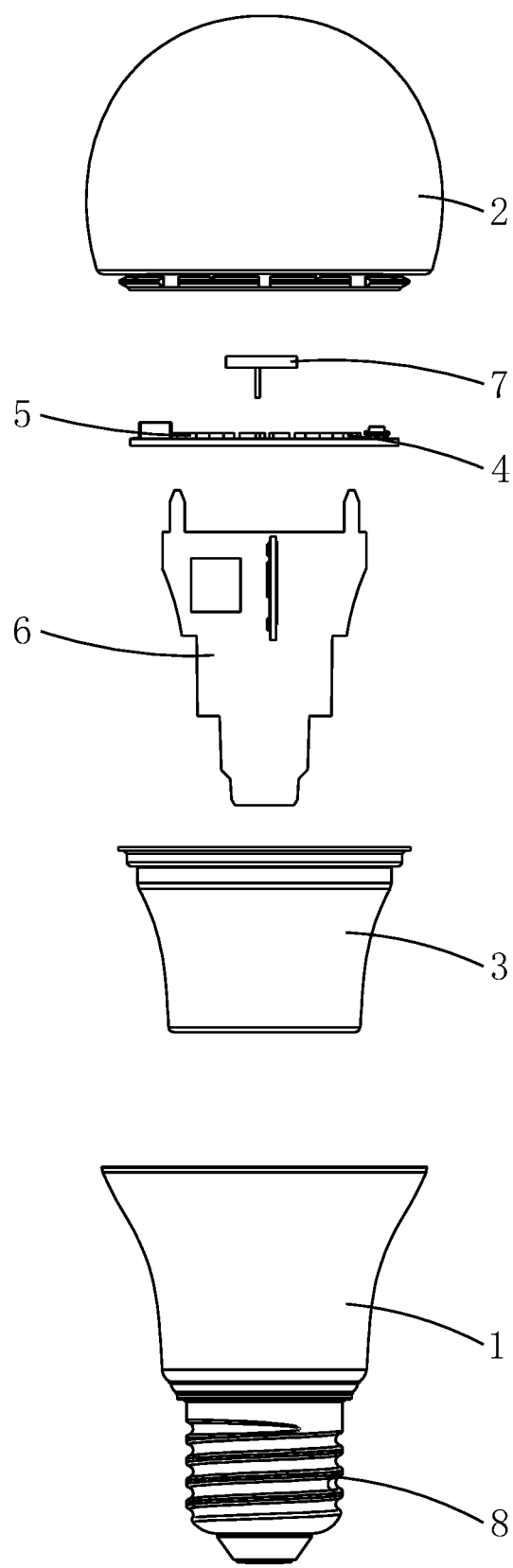
FIG. 1 illustrates an exploded view of a light bulb apparatus.

Please refer to FIG. 1, which shows an exploded view of a light bulb embodiment.

In FIG. 1, a bulb shell 2 is made of a transparent material for a light to pass through. An antenna 7 is placed on a light source plate 4. A LED module 5 is placed on the light source plate 4, too. There is a driver plate 6 mounted with driver components for converting an external power to a driving current supplied to the LED module 5. There is a heat sink ring 3 placed in a housing 1. An Edison cap 8 is attached to the housing 1 for receiving an external power source.

Figure 2:
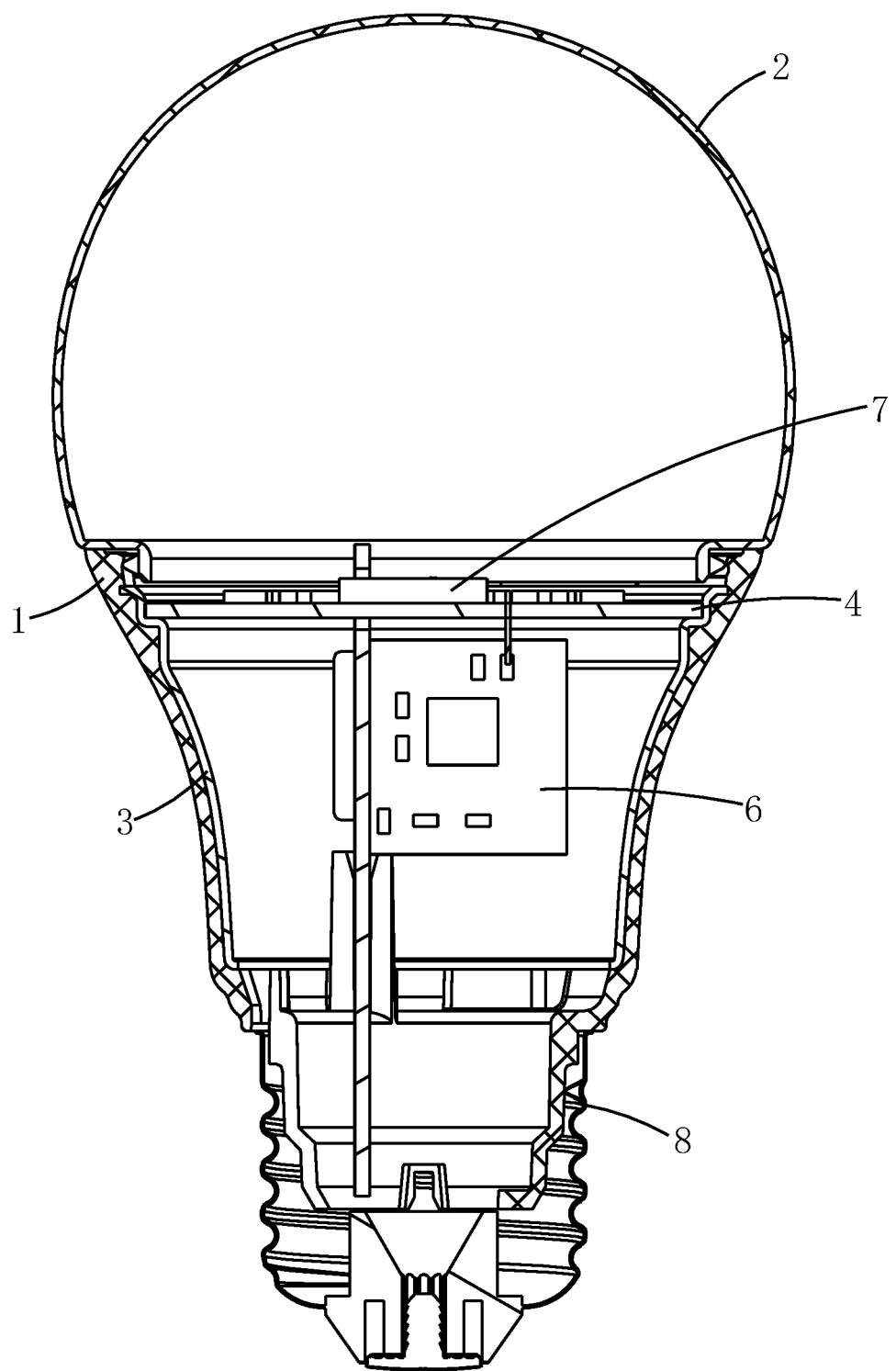
FIG. 2 illustrates a cross-sectional view of the example in FIG. 1.

FIG. 2 shows a cross-sectional view of the example in FIG. 1. The same reference numerals refer to the same components in FIG. 1.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A light bulb apparatus, comprising:
    a bulb shell;
    an antenna;
    a driver;
    a light source plate with a first layer and a second layer, wherein a LED module is disposed on the first layer, wherein the second layer comprises a metal portion, wherein the metal portion carries heat generated by the LED module for heat dissipation, wherein the antenna is disposed upon the first layer; and
    a bulb cap connected to an external power, wherein the driver is electrically connected to the antenna for receiving a wireless signal, wherein the driver converts the external power to a driving current supplied to the LED module, wherein the antenna is a ceramic module embedding a metal antenna unit.

2. The light bulb apparatus of claim 1, wherein the ceramic module is a plate with a horizontal diameter of a bottom surface larger than a thickness of the ceramic module, wherein the bottom surface engages the first layer of the light source plate.

3. The light bulb apparatus of claim 2, wherein an antenna conductive path is disposed to connect the antenna and the second layer of the light source plate to use the second layer together forming an antenna receiver.

4. The light bulb apparatus of claim 3, wherein the metal portion of the second layer has an antenna pattern corresponding to the wireless signal.

5. The light bulb apparatus of claim 4, wherein the light source plate has a third layer disposed between the first layer and the second layer, wherein the third layer has a larger thickness than the first layer and the second layer.

6. The light bulb apparatus of claim 4, wherein the light source plate further comprises a fourth layer, wherein the fourth layer is electrically connected to the antenna, wherein the second layer and the fourth layer correspond to different wireless frequencies.

7. The light bulb apparatus of claim 1, wherein the ceramic module has a reflective surface for reflecting a light of the LED module.

8. The light bulb apparatus of claim 1, wherein the thickness of the ceramic module is between 1 mm to 5 mm.

9. The light bulb apparatus of claim 1, wherein the driver has a driver plate, wherein the driver plate and the LED module are placed on opposite sides of the light source plate, wherein a wireless circuit is placed on the light source plate, wherein the LED module and the wireless circuit are electrically connected to the driver on the driver plate via signal pins of the driver plate, wherein the signal pins are inserted into sockets on the light source plate.

10. The light bulb apparatus of claim 1, wherein the light source plate has a central groove for placing the antenna.

11. The light bulb apparatus of claim 10, wherein an electric insulator is placed between the antenna and the light source plate.

12. The light bulb apparatus of claim 1, wherein the ceramic module containing multiple antenna units, wherein the multiple antenna units respectively correspond to different wireless protocols.

13. The light bulb apparatus of claim 12, wherein the multiple antenna units are detachably stacked together.

14. The light bulb apparatus of claim 1, wherein the light source plate has an antenna groove for placing the antenna.

15. The light bulb apparatus of claim 14, wherein an antenna electrode is placed on the antenna groove for electrically connecting the antenna to the driver.

16. The light bulb apparatus of claim 1, wherein the driver and the LED module are placed on the same side of the light source plate, and the antenna is placed in a center of the light source plate.

17. The light bulb apparatus of claim 1, wherein the bulb cap has an Edison cap for attaching to an Edison socket for connecting to the external power.

18. The light bulb apparatus of claim 17, wherein the driver and the LED module are placed at opposite sides of the light source plate, wherein the driver has an antenna pin inserted through a pin hole of the light source plate to electrically connected to the antenna.

19. The light bulb apparatus of claim 18, wherein the driver has a power pin inserted through the pin hole to electrically connect to the LED module.

\* \* \* \* \*